United States Patent Office 3,318,899
Patented May 9, 1967

3,318,899
DIAZATRICYCLODODECANES AND THEIR
PREPARATION
Leo A. Paquette, Kalamazoo County, Mich., assignor to
The Upjohn Company, Kalamazoo, Mich., a corporation of Delaware
No Drawing. Original application July 16, 1962, Ser.
No. 210,196. Divided and this application Feb. 25,
1966, Ser. No. 544,327
6 Claims. (Cl. 260—293)

This is a division of application Ser. No. 210,196 filed July 16, 1962.

This invention relates to novel compositions of matter and to methods for their preparation and is particularly directed to certain diazatricyclododecanes and their preparation.

The novel diazatricyclododecanes of the invention are represented by the following structural formula:

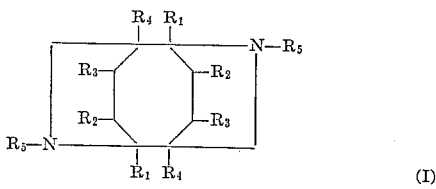

(I)

wherein $R_1$ is selected from the group consisting of hydrogen, methyl, and ethyl; $R_2$ is selected from the group consisting of hydrogen, methyl, and ethyl; $R_3$ is selected from the group consisting of hydrogen, methyl, and ethyl; $R_4$ is selected from the group consisting of hydrogen, methyl, and ethyl; and $R_5$ contains from 1 to 12 carbon atoms, inclusive and is selected from the group consisting of alkyl, cycloalkyl, aralkyl, hydroxyalkyl, alkoxyalkyl, and (alkoxy)$_n$-aralkyl wherein $n$ is an integer from 1 to 3, inclusive. Examples of alkyl are methyl, ethyl, propyl, butyl, pentyl, hexyl, heptyl, octyl, nonyl, decyl, undecyl, and dodecyl, and the isomeric forms thereof. Examples of cycloalkyl are cyclobutyl, cyclopentyl, cyclohexyl, cycloheptyl, cyclooctyl, cyclopentylpropyl, cyclononyl, bornyl, fenchyl and cyclodocecyl. Examples of aralkyl are benzyl, phenethyl, 2-1-phenethyl, and 3-phenylpropyl.

The novel diazatricyclododecanes of the invention are nitrogeneous bases and as such can exist in both the protonated and nonprotonated form according to the pH of the environment. The nonprotonated form can be oxidized, with hydrogen peroxide for example, to form the N-oxide. The N-oxide also can exist in both the protonated and nonprotonated form according to the pH of the environment. The protonated forms can be isolated as acid addition salts which are useful for upgrading the free base and free base N-oxide forms, i.e., the nonprotonated forms. Suitable acids for this purpose are hydrochloric acid, sulfuric acid, phosphoric acid, thiocyanic acid, fluosilicic acid, picric acid, Reinecke's acid, azobenzenesulfonic acid, and the like. The acid addition salt can be formed by neutralizing the free base or free base N-oxide with the appropriate acid or by metathesis of a simple acid addition salt such as the hydrochloride or sulfate with another salt of the desired acid.

The novel diazatricyclododecanes of the invention are useful intermediates. Thus, the condensation products obtained from the thiocyanic acid addition salts and formaldehyde according to U.S. Patents 2,425,320 and 2,606,155 are useful as pickling inhibitors, and the fluosilicic acid addition salts are useful as mothproofing agents according to U.S. Patents 1,915,334 and 2,075,359.

The novel compounds of the invention can also exist in the form of quaternary ammonium salts, such for example, as those obtained by coordinating the free base form with a lower-alkyl halide, for example, methyl, ethyl, propyl, butyl, pentyl, hexyl, heptyl, and octyl chloride, including the isomers thereof. The quaternary ammonium salts are useful for forming the corresponding fluosilicic acid salts which are useful as mothproofing agents. These fluosilicic acid salts can be formed by metathesis with an inorganic fluosilicate or by springing the quaternary ammonium hydroxide (by treating the salt with an equivalent of base, e.g., NaOH) and neutralizing it with fluosilicic acid. The compounds of the invention can be prepared by reducing with lithium aluminum hydride a compound of the following formula:

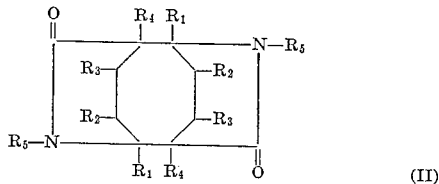

(II)

wherein $R_1$, $R_2$, $R_3$, $R_4$, and $R_5$ are as given above. The latter compounds (Formula II) can be prepared by hydrogenating with hydrogen in an organic solvent, for example, acetic acid or a lower-alkanol, in the presence of a catalyst effective to saturate olefinic double bonds, for example, platinum or palladium oxides, a compound having the following structure:

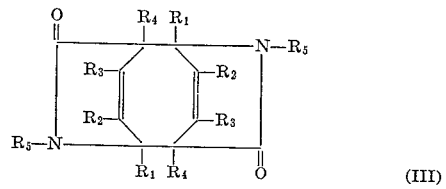

(III)

wherein $R_1$, $R_2$, $R_3$, $R_4$, and $R_5$ are as given above.

The intermediate III can be prepared by the photodimerization of a 2-pyridone having the formula:

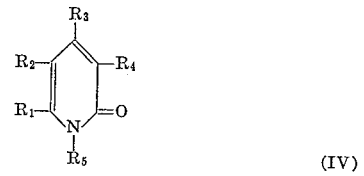

(IV)

wherein $R_1$, $R_2$, $R_3$, $R_4$ and $R_5$ are as given above. The photodimerization is advantageously effected in aqueous solution at room temperature (24 to 30° C.) because of the ease with which the dimers can be isolated. For the more insoluble 2-pyridones, an organic solvent, for example ethanol or other lower-alkanol, benzene, toluene, hexane, chloroform, carbon tetrachloride, diethyl ether or other di-lower-alkyl ethers, and the like, can be used. Higher or lower temperature, say from about 0 to about 75 degrees centigrade can be used. The light source can be any ultraviolet lamp, filtered or unfiltered, giving off radiations in the range of about 240 to 260 millimicrons.

The starting compounds IV can be prepared by alkylating 2-pyridone by the procedure of Rath [Ann, 489, 107 (1931)], according to the following equation:

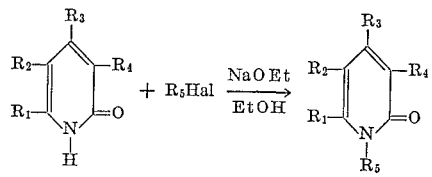

wherein Hal is halogen, e.g., chlorine, bromine, or iodine, and $R_1$, $R_2$, $R_3$, $R_4$, and $R_5$ are as given above. Alternatively, they can be prepared by alkylating pyridine and oxidizing with alkali metal ferricyanide by the procedure of U.S. Patent 1,941,312 according to the following equations:

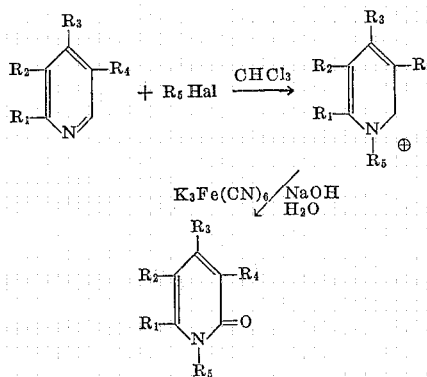

wherein Hal and $R_1$, $R_2$, $R_3$, $R_4$, and $R_5$ are as given above. Another procedure that can be used is that of Bradlow and Vanderwerf [J. Org. Chem., 16, 73 (1951)] according to the following equations:

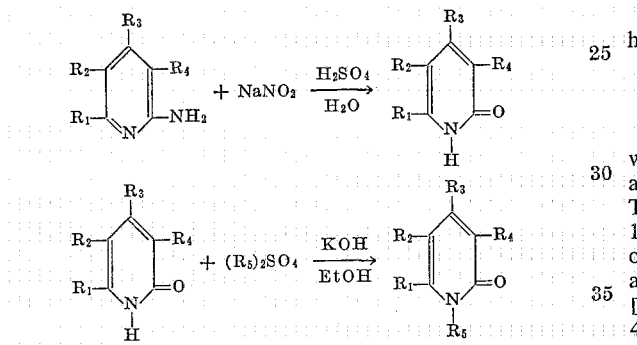

wherein $R_1$, $R_2$, $R_3$, $R_4$, and $R_5$ are as given above.

The invention can now be more fully understood by reference to the following examples which are given by way of illustration and in which parts and percentages are by weight unless otherwise specified.

EXAMPLE 1.—$R_5$=METHYL

Part A.—3,7-dimethyl-3,7-diazatricyclo[4.2.2.2$^{2,5}$] dodeca-9,11-diene-4,8-dione A solution of 50 g. (0.457 mole) of 1-methyl-2(1H)-pyridone in 300 ml. of water was irradiated for 48 hr. at 25° C. with a 200 watt unfiltered mercury vapor ultraviolet lamp. The solution was extracted with three 150 ml. portions of methylene chloride and the combined organic layers were dried, filtered and evaporated. The residual material was treated with ethanol-ether (1:2) and cooled. The crystals were filtered, washed with ether and dried to give 21.6 g. (43.2%) of 3,7-dimethyl-3,7-diazatricyclo[4.2.2.2$^{2,5}$]dodeca-9,11-diene-4,8-dione, M.P. 222–222.5°. Pure 3,7 - dimethyl - 3,7 - diazatricyclo[4.2.2.2$^{2,5}$]-dodeca-9,11-diene-4,8-dione was obtained as fine white platelets from ethanol-ether, M.P. 222.5°.

Analysis: Calc'd for $C_{12}H_{14}N_2O_2$: C, 66.03; H, 6.47; N, 12.84. Found: C, 65.89; H, 6.27; N, 12.73.

M.W. Calc'd. 218; found: 231.

Part B.—3,7-dimethyl-3,7-diazatricyclo[4.2.2.2$^{2,5}$] dodecane-4,8-dione

A solution of 35.7 g. (0.164 mole) of 3,7-dimethyl-3,7 - diazatricyclo[4.2.2.2$^{2,5}$]dodeca-9,11-diene-4,8-dione of Part A in 350 ml. of 95% ethanol containing 500 mg. of platinum oxide gas was hydrogenated in a Parr apparatus. The consumption of hydrogen ceased after an uptake of 104% of theory. The catalyst was filtered and the filtrate concentrated. The dried residue was twice recrystallized from ethanol-ether to give 34.5 g. (94.7%) of white crystals of 3,7-dimethyl-3,7-diazatricyclo[4.2.2.2$^{2,5}$]dodecane-4,8-dione, M.P. 284–285°.

Part C.—3,7-dimethyl-3,7-diazatricyclo[4.2.2.2$^{2,5}$] dodecane dihydrochloride To a stirred slurry of 19.0 g. (0.50 mole) of lithium aluminum hydride in 350 ml. of dry, purified tetrahydrofuran was added in portions a slurry of 34.4 g. (0.154 mole) of the 3,7-dimethyl-3,7-diazatricyclo[4.2.2.2$^{2,5}$] dodecane-4,8-dione of Part B in 400 ml. of the same solvent. The resulting mixture was refluxed with stirring for 2 hrs. and allowed to stand overnight at room temperature. To the rapidly stirred mixture cooled in ice, there was added 19 ml. of water, 57 ml. of 25% sodium hydroxide solution and 19 ml. of water in that order. The precipitated salts were filtered and washed well with ether and methylene chloride. The combined filtrates were dried, filtered and evaporated to give, after thorough drying 29.4 g. (98.5%) of pale yellow solid which was converted directly to its dihydrochloride. Recrystallization from ethanol-ether gave pure 3,7-dimethyl-3,7-diazatricyclo[4.2.2.2$^{2,5}$]dodecane dihydrochloride as white blades, M.P. 274° foaming).

Analysis: Calc'd for $C_{12}H_{24}Cl_2N_2$: C, 53.93; H, 9.05; N, 10.48. Found: C, 54.04; H, 9.22; N, 10.34.

In tests for pharmacodynamic activity in mice the dihydrochloride showed sedative activity.

Part D.—3,7-dimethyl-3,7-diazatricyclo[4.2.2.2$^{2,5}$] dodecane free base

A 4.60 g. (0.017 mole) sample of the dihydrochloride was dissolved in 20 ml. of water and to the solution was added 50 ml. of concentrated ammonium hydroxide. The white solid which separated was extracted with two 100 ml. portions of methylene chloride The combined organic layers were dried, filtered and evaporated to afford 3.1 g. (94.%) of 3,7-dimethyl-3,7-diazatricyclo-[4.2.2.2$^{2,5}$]dodecane free base as white prisms, M.P. 48–48.5° (from hexane).

Analysis: Calc'd for $C_{12}H_{22}N_2$: C, 74.17; H, 11.41; N, 14.42. Found: C, 74.45; H, 11.12; N, 14.21.

EXAMPLE 2.—$R_5$=ETHYL 3,7-diethyl-3,7-diazatricyclo[4.2.2.2$^{2,5}$]dodeca-9,11-diene-4,8-dione A solution of 50.0 g. (0.406 mole) of 1-ethyl-2(1H) pyridone in 300 ml. of water was irradiated for 48 hrs. at 25° with a 200 watt unfiltered mercury vapor ultraviolet lamp. The solution was extracted with three 200 ml. portions of methylene chloride. The combined organic layers were dried, filtered and evaporated. The white semi-solid was treated with benzene-hexane (1:1), and the crystals were filtered and dried to give 20.75 g. (41.5%) of 3,7 - diethyl - 3,7 - diazatricyclo[4.2.2.2$^{2,5}$] dodeca-9,11-diene-4,8-dione as fluffy white platelets, M.P. 208–209°. The analytical sample was prepared by recrystallization of this material from ethanol-ether, shiny white platelets, M.P. 209–210°.

Analysis: Calc'd for $C_{14}H_{18}N_2O_2$: C, 68.27; H, 7.37; N, 11.37. Found: C, 68.50; H, 7.62; N, 11.34.

M.W. calc'd 246; found: 260.

In tests for pharmacodynamic activity in mice, this compound displayed antiappetite activity.

On hydrogenation as in Example 1, Part B, and reduction as in Example 1, Part C, there are obtained 3,7-diethyl-3,7-diazatricyclo[4.2.2.2$^{2,5}$]dodecane - 4,8 - dione and 3,7-diethyl-3,7-diazatricyclo[4.2.2.2$^{2,5}$]dodecane free base and the dihydrochloride thereof.

EXAMPLE 3.—$R_5$=PROPYL

Part A.—3,7-dipropyl-3,7-diazatricyclo[4.2.2.2$^{2,5}$] dodeca-9,11-diene-4,8-dione A solution of 30.0 g. (0.218 mole) of 1-propyl-2(1H) pyridone in 375 ml. of water was irradiated for 48 hrs. as described above. The aqueous solution was extracted with two 250-ml. portions of methylene chloride and the combined organic layers were dried, filtered and evaporated. The semi-solid residue was treated with hexane-ether (1:1), and the solid was separated by filtration and dried to give 8.85 g. (29.5%) of product, M.P. 198–199°. The pure photodimer, 3,7-dipropyl-3,7-diazatricyclo[4.2.2.2$^{2,5}$]dodeca-9,11-diene-4,8-dione, was obtained as white prisms from ethanol-ether, M.P. 199°.

Analysis: Calc'd for $C_{16}H_{22}N_2O_2$: C, 70.04; H, 8.08; N, 10.21. Found: C, 70.00; H, 8.02; N, 10.23.

M.W. calc'd 274; found: 272.

In tests for pharmacodynamic activity in mice, this compound displayed sedative and muscle relaxant activity.

Part B.—3,7-dipropyl-3,7-diazatricyclo[4.2.2.2$^{2,5}$]dodecane-4,8-dione

A 1.70 g. (.006 mole) sample of the photodimer of Part A in 50 ml. of ethanol containing 200 mg. of platinum oxide was hydrogenated in a Parr apparatus. The catalyst was filtered and the filtrate was concentrated to give 1.65 g. (97.0%) of 3,7-dipropyl-3,7-diazatricyclo-[4.2.2.2$^{2,5}$]dodecane-4,8-dione as a white solid, M.P. 203–206°. Pure product was obtained as white prisms from ethanol-ether, M.P. 210–211°.

Analysis: Calc'd for $C_{16}H_{26}N_2O_2$: C, 69.03; H, 9.41; N, 10.06. Found: C, 68.89; H, 9.11; N, 10.28.

In tests for pharmacodynamic activity in mice, this compound displayed sedative and antiinflammatory activities.

On treatment as in Example 1 Parts C and D, there are obtained 3,7 - dipropyl - 3,7 - diazatricyclo[4.2.2.2$^{2,5}$]dodecane free base and the dihydrochloride thereof.

EXAMPLE 4.—$R_5$=ISOPROPYL

Part A.—3,7-diisopropyl-3,7-diazatricyclo[4.2.2.2$^{2,5}$]dodeca-9,11-diene-4,8-dione A solution of 11.9 g. (0.087 mole) of 1-isopropyl-2(1H)-pyridone in 375 ml. of water was irradiated for 4 days as previously described. The aqueous solution was extracted with three 150-ml. portions of methylene chloride and the combined organic layers were dried, filtered and evaporated. The semi-crystalline residue was treated with benzene-hexane (1:1), filtered and dried to give 2.85 g. (24.0%) of white solid, M.P. 222–224°. Pure photodimer, 3,7-diisopropyl-3,7-diazatricyclo[4.2.2.2$^{2,5}$]dodeca-9,11-diene-4,8-dione, was obtained as white needles from benzene-ethanol-hexane, M.P. 228–229°.

Analysis: Calc'd for $C_{16}H_{22}N_2O_2$: C, 70.04; H, 8.08; N, 10.21. Found: C, 70.22; H, 8.30; N, 10.38.

M.W. calc'd 274; found: 285.

In tests for pharmacodynamic activity in mice, this compound displayed sedative and antiinflammatory activities.

Part B.—3,7-diisopropyl-3,7-diazatricyclo[4.2.2.2$^{2,5}$]dodecane-4,8-dione

A solution of 1.40 g. (5.1 mmoles) of the photodimer of Part A in 150 ml. of ethanol containing 100 mg. of platinum oxide was hydrogenated in a Parr apparatus. The consumption of hydrogen ceased after the uptake of 98% of theory. The catalyst was filtered and the filtrate concentrated. The dried residue (1.40 g., 99%), M.P. 232–236°, was twice recrystallized from ethanol-ether to give 3,7-diisopropyl-3,7-diazatricyclo[4.2.2.2$^{2,5}$]dodecane-4,8-dione as shiny white platelets, M.P. 247–249°.

Analysis: Calc'd for $C_{16}H_{26}N_2O_2$: C, 69.03; H, 9.41; N, 10.06. Found: C, 69.05; H, 9.19; N, 9.90.

In tests for pharmacodynamic activity in mice, this compound showed CNS stimulant activity.

On reduction as in Example 1, Part C, there are obtained 3,7 - diisopropyl - 3,7 - diazatricyclo[4.2.2.2$^{2,5}$]dodecane free base and the dihydrochloride thereof.

EXAMPLE 5.—$R_5$=2-HYDROXYETHYL

Part A.—3,7-bis(2-hydroxyethyl)-3,7-diazatricyclo[4.2.2.2$^{2,5}$]dodeca-9,11-diene-4,8-dione A solution of 56.5 g. (0.40 mole) of 1-(2-hydroxyethyl)-2(1H)-pyridone in 300 ml. of water was irradiated for 16 hrs. as described previously. The precipitated white solid was filtered, washed with ethanol and dried to give 10.5 g. (18.6%) of dimer, 3,7-bis(2-hydroxyethyl)-3,7-diazatricyclo[4.2.2.2$^{2,5}$]-dodeca-9,11-diene-4,8-dione, M.P. 225–228°. Recrystallization of this material from water afforded pure product as fine white micro crystals, M.P. 229°.

Analysis: Calc'd for $C_{14}H_{18}N_2O_4$: C, 60.42; H, 6.52; N, 10.07. Found: C, 60.45; H, 6.88; N, 9.98.

In tests for pharmacodynamic activity in mice, this compound displayed sedative and antiappetite activities.

Part B.—3,7-bis(2-hydroxyethyl)-3,7-diazatricyclo[4.2.2.2$^{2,5}$]dodecane-4,8-dione A solution of 5.5 g. (0.02 mole) of the photodimer of Part A in 150 ml. of acetic acid-water (2:1) containing 250 mg. of platinum oxide was hydrogenated in a Parr bomb. Hydrogen uptake ceased after the consumption of 105% of theory. The catalyst was filtered and the filtrate was evaporated under reduced pressure. Ethanol (50 ml.) was added and also evaporated. After thorough drying of the residue, there was obtained 5.5 g. (100%) of white solid, M.P. 229–230°. Recrystallization of this material from water gave the analytical sample as a fine white powder, M.P. 230–231.5°.

Analysis: Calc'd for $C_{14}H_{22}N_2O_4$: C, 59.55; H, 7.85; N, 9.92. Found: C, 59.57; H, 7.56; N, 10.10.

In tests for pharmacodynamic activity in mice, this compound displayed antiappetite activity.

On reduction as in Example 1, Part C, there are obtained 3,7 - bis(2 - hydroxyethyl) - 3,7 - diazatricyclo[4.2.2.2$^{2,5}$]dodecane free base and the dihydrochloride thereof.

EXAMPLE 6.—$R_5$=ANISYL(p-METHOXYBENZYL)

Part A.—1-(4-methoxybenzyl)-2-(1H)-pyridone

A mixture of 15.7 g. (0.10 mole) of anisyl chloride and 18.5 g. (0.15 mole) of 2-ethoxypyridine was heated with stirring at 135° for 24 hrs. The material was chromatographed directly on magnesium silicate. Elution with hexane removed starting materials and elution with ether afforded 21.5 g. (100%) of white crystals, M.P. 84–86°, after drying. Pure 1-(4-methoxybenzyl)-2(1H)-pyridone was obtained as fluffy white needles from benzene-hexane, M.P. 84.5–86°.

Analysis: Calc'd for $C_{13}H_{13}NO_2$: C, 72.54; H, 6.09; N, 6.51. Found: C, 72.45; H, 5.79; N, 6.60.

Part B.—3,7-bis(p-methoxybenzyl)-3,7-diazatricyclo[4.2.2.2$^{2,5}$]dodeca-9,11-diene-4,8-dione A solution of 40 g. (0.186 mole) of the pyridone of Part A in 400 ml. of 50% aqueous ethanol was irradiated for 20 hrs. as previously described. The precipitated solid was filtered and the filtrate was reirradiated for 23 hrs. There was obtained a total of 5.2 g. (13.0%) of greyish solid, M.P. 228–232°. Three recrystallizations of this material from dimethylformamide gave pure photodimer, 3,7-(bis(p - methoxybenzyl)-3,7-diazatricyclo[4.2.2.2$^{2,5}$]dodeca-9,11-diene-4,8-dione, as white platelets, M.P. 232°.

Analysis: Calc'd for $C_{20}H_{26}N_2O_4$: C, 72.54; H, 6.09; N, 6.51. Found: C, 72.22; H, 5.93; N, 6.80.

On hydrogenation as in Example 1, Part B, and reduction as in Example 1, Part C, there are obtained 3,7-bis(p - methoxy-benzyl) - 3,7 - diazatricyclo[4.2.2.2$^{2,5}$]dodecane-4,8-dione and 3,7-bis(p-methoxybenzyl)-3,7-diazatricyclo[4.2.2.2$^{2,5}$]dodecane free base and the dihydrochloride thereof.

By substituting the anisyl chloride in Example 6 by the appropriate $R_5$Cl or $R_5$Br, for example, where $R_5$ is 2-methoxybenzyl, 3-methoxybenzyl, 3,4-dimethoxybenzyl, 3,4,5-trimethoxybenzyl, benzyl, phenethyl, 1-phenethyl, 3-phenylpropyl, 2-, 3-, and 4-methoxy(3-phenylpropyl), 3,4 - dimethoxy(3 - phenylpropyl),3,4,5 - trimethoxy(3-phenyl-propyl), cyclobutyl, cyclopentyl, cyclohexyl, cycloheptyl, cyclooctyl, cyclononyl, bornyl, frenchyl, and 3-cyclopentyl-propyl, there are obtained the corresponding 3,7 - bis($R_5$) - 3,7 - diazatricyclo[4.2.2.2$^{2,5}$]dodeca-9,11-diene-4,8-diones; 3,7-bis($R_5$)-3,7-diazatricyclo[4.2.2.2$^{2,5}$] dodecane - 4,8 - diones; and 3,7-bis($R_5$)-3,7-diazatricyclo [4.2.2.2$^{2,5}$]dodecanes.

EXAMPLE 7.—$R_1$ AND $R_5$=METHYL

Part A.—6-methyl-2(1H)-pyridone

This material was prepared by the method of R. Adams and A. W. Schrecker [J. Am. Chem. Soc., 71, 1186 (1948)]. Diazotization of 216 g. (2.0 moles) of 2-amino-6-methyl-pyridine afforded 184 g. (84.5%) of the pyridone, large white crystals from benzene, M.P. 158–159°.

Part B.—1,6-dimethyl-2(1H)-pyridone

This material was prepared by the method of R. Adams and A. W. Schrecker [J. Am. Chem. Soc., 71, 1186 (1949)]. Methylation of 173.5 g. (1.59 moles) of 6-methyl-2(1H)-pyridone with dimethyl sulfate afforded 130 g. (66.3%) of deliquescent white crystals (from ether), M.P. 56-58°.

Part C. — 2,3,6,7-tetramethyl-3,7-diazatricyclo[4.2.2.2$^{2,5}$] dodeca-9,11-diene-4,8-dione A solution of 40.0 g. (0.325 mole) of 1,6-dimethyl-2(1H)-pyridone of Part B in 300 ml. of water was irradiated for 24 hrs. as previously described. The precipitated solid was filtered and dried to give 19.0 g. of dimer. From methylene chloride extracts of the filtrate, there was obtained an additional 1.8 g. of dimer, 2,3,6,7,-tetramethyl - 3,7 - diazatricyclo[4.2.2.2$^{2,5}$]dodeca-9,11-diene-4,8-dione (total yield, 20.8 g., 52.0%), M.P. 200–201°. The analytical sample was obtained as fluffy white microneedles from ethanol-ether, M.P. 201–201.5°.

*Analysis*: Calc'd for $C_{14}H_{18}N_2O_2$: C, 68.27; H, 7.37; N, 11.37. Found: C, 68.55; H, 7.20; N, 10.98.

M.W. calc'd 246; found 246.

In tests for pharmacodynamic activity in mice, this compound displayed antiappetite activity and caused an increase in body fat.

On hydrogenation as in Example 1, Part B, and reduction as in Example 1, Part C, there are obtained 2,3,6,7-tetramethyl - 3,7 - diazatricyclo[4.2.2.2$^{2,5}$]dodecane-4,3-dione, and 2,3,6,7-tetramethyl-3,7-diazatricyclo[4.2.2.2$^{2,5}$] dodecane free base and the dihydrochloride thereof.

EXAMPLE 8.—$R_2$ AND $R_5$=METHYL

Part A.—5-methyl-2(1H)pyridone

This material was prepared by the method of H. L. Bradlow and C. A. Vanderwerf [J. Org. Chem. 16, 73 (1951)]. Diazotization of 216 g. (2.0 moles) of 2-amino-5-methyl-pyridine afforded 44.0 g. (21.0%) of white crystals, M.P. 181-182°.

Part B.—1,5-dimethyl-2(1H)-pyridone

This material was prepared by the method of H. L. Bradlow and C. A. Vanderwerf (loc. cit.). Methylation of 40.0 g. (0.366 mole) of 5-methyl-2(1H)-pyridone afforded 36.5 g. (81.0%) of colorless distillate, B.P. 88–92° (0.5 mm.).

Part C.—3,7,10,12-tetramethyl-3,7-diazatricyclo [4.2.2.2$^{2,5}$]dodeca-9,11-diene-4,8-dione A solution of 30.0 g. (0.244 mole) of 1,5-dimethyl-2(1H)-pyridone in 300 ml. of water was irradiated for 16 hrs. as previously described. The precipitated solid was filtered, washed with ether and dried to give 13.6 g. of white crystals, M.P. 239–241°. Methylene chloride extraction of the filtrate afforded an additional 3.9 g. of dimer, M.P. 185–227° (total yield, 17.5 g., 58.3%). Pure photodimer, 3,7,10,12-tetramethyl-3,7-diazatricyclo-[4.2.2.2$^{2,5}$]dodeca-9,11-diene-4,8-dione, was obtained as shiny white platelets from aqueous ethanol-ether, M.P. 240–241°.

*Analysis*: Calc'd for $C_{14}H_{18}N_2O_2$: C, 68.27; H. 7:37; N, 11.37. Found: C, 68.00; H, 7.52; N, 11.08.

M.W. calc'd. 246; found: 299.

In pharmacodynamic tests with mice, this compound displayed antiappetite activity.

On hydrogenation as in Example 1, Part B, and reduction as in Example 1, Part C, there are obtained 3,7,10,12-tetramethyl - 3,7 - diazatricyclo[4.2.2.2$^{2,5}$]dodecane-4,8-dione, and 3,7,10,12 - tetramethyl - 3,7 - diazatricyclo [4.2.2.2$^{2,5}$]dodecane free base and the dihydrochloride thereof.

EXAMPLE 9.—$R_3$ AND $R_5$=METHYL

Part A.—4-methyl-2(1H)-pyridone

This material was prepared by the method of R. Adams and A. W. Schrecker [J. Am. Chem. Soc., 71, 1186 (1949)]. Diazotization of 216 g. (2.0 moles) of 2-amino-4-methyl-pyridine afforded 140 g. (64.6%) of the white crystalline pyridone, M.P. 124–125°.

Part B.—1,4-dimethyl-2(1H)-pyridone

This material was prepared by the method of R. Adams and A. W. Schrecker (loc. cit.). Methylation of 132 g. (1.21 moles) of 4-methyl-2(1H)-pyridone afforded 134 g. (90.0%) of a deliquescent solid, B.P. 95–98° (0.75 mm.), M.P. 57–59°.

Part C.—3,7,9,11-tetramethyl-3,7-diazatricyclo]4.2.2.2$^{2,5}$] dodeca-9,11-diene-4,8-dione A solution of 40.0 g. (0.325 mole) of 1,4-dimethyl-2 (1H)-pyridone in 300 ml. of water was irradiated for 16 hrs. as previously described. The precipitated solid was filtered, washed with water and dried to give 3.85 g. of dimer, M.P. 240°. Methylene chloride extraction of the filtrate afforded an additional 3.75 g., M.P. 235–238° (total yield 7.6 g., 19.0%). Pure photodimer, 3,7,9,11-tetramethyl - 3,7 - diazatricyclo[4.2.2.2$^{2,5}$]dodeca - 9,11-diene-4,8-dione, was obtained as white prisms from 90% ethanol-ether, M.P. 241°.

*Analysis:* Calc'd for $C_{14}H_{18}N_2O_2$: C, 68.27; H, 7.37; N, 11.37. Found: C, 68.09; H, 7.03; N, 11.18.

M.W. calc'd 246; found: 239.

In tests for pharmacodynamic activity in mice this compound displayed antiappetite activity.

On hydrogenation as in Example 1, Part B, and reduction as in Example 1, Part C, there are obtained 3,7,9, 11 - tetramethyl-3,7-diazatricyclo[4.2.2.2$^{2,5}$]dodecane-4,8-dione, and 3,7,9,11 - tetramethyl-3,7-diazatricyclo[4.2.2.2$^{2,5}$]dodecane free base and the dihydrochloride thereof.

EXAMPLE 10.—$R_4$ AND $R_5$=METHYL

Part A.—3-methyl-2(1H)-pyridone

This material was prepared by the method of H. L. Bradlow and C. A. Vanderwerf [J. Org. Chem., 16, 73 (1951)]. Diazotization of 216 g. (2.0 moles) of 2-amino-3-methyl-pyridine afforded 157 g. (72.0%) of the white crystalline pyridone, M.P. 139–140°.

Part B.—1,3-dimethyl-2(1H)-pyridone

This material was prepared by the method of H. L. Bradlow and C. A. Vanderwerf [J. Org. Chem., 16, 73 (1951)]. Methylation of 150 g. (1.37 moles) of 3-methyl-2(1H)-pyridone afforded 134 g. (79.7%) of colorless liquid, B.P. 83–86° (0.75 mm.), $n_D^{25}$ 1.5538.

Part C.—1,3,5,7-tetramethyl-3,7-diazatricyclo[4.2.2.2$^{2,5}$] dodeca-9,11-diene-4,8-dione A solution of 40.0 g. (0.325 mole) of 1,3-dimethyl-2(1H)-pyridone in 300 ml. of water was irradiated for 16 hrs. as previously described. The precipitated solid was filtered, washed with ice water and dried to give 3.60 g. of dimer, M.P. 191°. Methylene chloride extraction of the filtrate afforded an additional 2.15 g., M.P. 191° (total yield 5.75 g., 14.4%). Pure photodimer, 1,3,5,7-tetramethyl - 3,7-diazatricyclo[4.2.2.2$^{2,5}$]dodeca-9,11-diene-4, 8-dione, was obtained as white platelets from ethanol-ether, M.P. 191°.

Analysis: Calc'd for $C_{14}H_{18}N_2O_2$: C, 68.27; H, 7.37; N, 11.37. Found: C, 68.17; H, 7.32; N, 11.14.

M.W. calc'd 246; found: 237.

In tests for pharmacodynamic activity in mice, this compound displayed CNS stimulant activity and antiappetite activity.

On hydrogenation as in Example 1, Part B, and reduction as in Example 1, Part C, there are obtained 1,3,5,7-tetramethyl - 3,7 - diazatricyclo[$4.2.2.2^{2,5}$]dodecane - 4,8-dione, and 1,3,5,7-tetramethyl-3,7-diazatricyclo[$4.2.2.2^{2,5}$]dodecane free base and the hydrochloride thereof.

Following the procedures of Examples 7, 8, 9, and 10 substituting other methyl and ethyl substituted 2-aminopyridines there are obtained compounds in which any or all of $R_1$, $R_2$, $R_3$, and $R_4$ can be methyl or ethyl. Also by substituting other alkylating agents $R_5$ can be any of the radicals disclosed above in connection with Formula I.

EXAMPLE 11

Part A.—3,3,7-trimethyl-7-aza-3-azoniatricyclo[$4.2.2.2^{2,5}$] dodecane iodide

A solution of 14.0 g. (0.072 mole) of the diamine of Part C, Example 1, in 150 ml. of ethanol was treated with 56.8 g. (0.40 mole) of methyl iodide and the solution was refluxed for 3 hrs. Ether (100 ml.) was added and the mixture was cooled. The precipitated solid was filtered and dried to give 23.6 g. (97.7%) of pale yellow solid, M.P. 208–212° (dec.). This material was recrystallized three times from ethanol to give pure 3,3,7-trimethyl-7-aza-3-azoniatricyclo[$4.2.2.2^{2,5}$]dodecane iodide as a white solid, M.P. 214–215° (dec.).

Analysis: Calc'd for $C_{13}H_{25}IN_2$: C, 46.43; H, 7.49; N, 8.33. Found: C, 46.15; H, 7.32; N, 8.14.

In tests for pharmacodynamic activity in mice, this compound displayed diuretic activity.

Part B.—3,3,7,7 - tetramethyl - 3,7-diazoniatricyclo[$4.2.2.2^{2,5}$]dodecane diiodide A slurry of 10.0 g. (0.0298 mole) of the monomethiodide of Part A in 95 ml. of methyl iodide was heated in an autoclave at 120–130° for 8 hrs. The solvent was evaporated and the gummy residue was recrystallized from 90% ethanol-ether. The crystals which formed were filtered and dried to yield 7.6 g. (53.5%) of 3,3,7,7-tetramethyl - 3,7-diazoniatricyclo[$4.2.2.2^{2,5}$]dodecane diiodide, M.P. 205–206.5°. The analytical sample was prepared by recrystallization of this material from 75% ethanol, white powder, M.P. 212° (dec.).

Analysis: Calc'd for $C_{14}H_{28}I_2N_2$: C, 35.16; H, 5.90; N, 5.86. Found: C, 34.85; H, 5.91; N, 5.52.

In tests for pharmacodynamic activity this compound displayed CNS stimulant activity.

All the compounds described above, except those having methyl and ethyl substituents in the two and six positions, have point symmetry.

I claim:
1. A compound of the formula

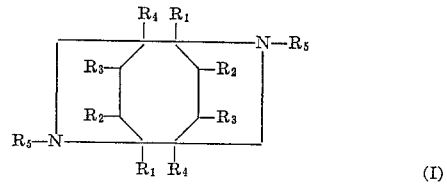

(I)

wherein $R_1$ is selected from the group consisting of hydrogen, methyl, and ethyl; $R_2$ is selected from the group consisting of hydrogen, methyl, and ethyl; $R_3$ is selected from the group consisting of hydrogen, methyl, and ethyl; $R_4$ is selected from the group consisting of hydrogen, methyl, and ethyl; and $R_5$ contains from 1 to 12 carbon atoms, inclusive, and is selected from the group consisting of alkyl, cycloalkyl, aralkyl, hydroxyalkyl, alkoxyalkyl, and (alkoxy)$_n$-aralkyl wherein $n$ is an integer from 1 to 3, inclusive, said cycloalkyl and aralkyl being hydrocarbon.

2. 3,7 - di - loweralkyl - 3,7 - diazatricyclo[$4.2.2.2^{2,5}$] dodecane, a species of claim 1 wherein $R_5$ is loweralkyl and $R_1$, $R_2$, $R_3$, and $R_4$ are hydrogen.

3. 3,7 - dimethyl - 3,7-diazatricyclo[$4.2.2.2^{2,5}$]dodecane free base, a species of claim 1 wherein $R_5$ is methyl and $R_1$, $R_2$, $R_3$, and $R_4$ are hydrogen.

4. 3,7 - dimethyl - 3,7-diazatricyclo[$4.2.2.2^{2,5}$]dodecane dihydrochloride, a species of claim 1 wherein $R_5$ is methyl and $R_1$, $R_2$, $R_3$, and $R_4$ are hydrogen.

5. 3,3,7 - trimethyl - 7-aza-3-azoniatricyclo[$4.2.2.2^{2,5}$] dodecane iodide, the monomethiodide of the compound of claim 3.

6. 3,3,7,7 - tetramethyl - 3,7-diazoniatricyclo[$4.2.2.2^{2,5}$] dodecane diiodide, the dimethiodide of the compound of claim 3.

References Cited by the Examiner

Taylor et al., Tetrahedron Letter #25, pp. 1–3, 1960.
Ayer et al., Tetrahedron Letter #18, pp. 648–653, 1961.
Gaylord, Reduction with Complex Metal Hydrides, pp. 594–595 and 602. Interscience, N.Y. (1956).

WALTER A. MODANCE, Primary Examiner.

AVROM D. SPEVACK, Assistant Examiner.